Sept. 11, 1923.  S. I. PRESCOTT ET AL  1,467,588
WHEEL RIM
Filed Dec. 12, 1919
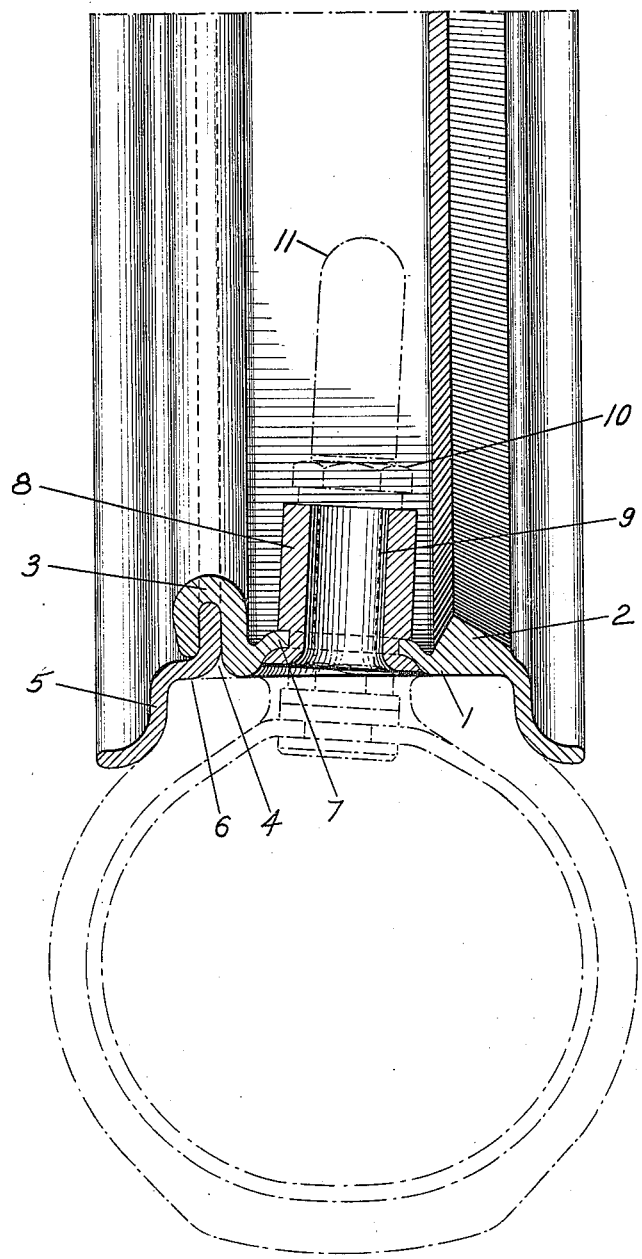

Patented Sept. 11, 1923.

1,467,588

UNITED STATES PATENT OFFICE.

SYDNEY I. PRESCOTT, OF NEW YORK, N. Y., AND FRANCIS J. RUMMLER, OF LYNDHURST, NEW JERSEY.

WHEEL RIM.

Application filed December 12, 1919. Serial No. 344,283.

*To all whom it may concern:*

Be it known that we, SYDNEY I. PRESCOTT and FRANCIS J. RUMMLER, citizens of the United States, respectively residing in the city, county, and State of New York, and the town of Lyndhurst, county of Bergen, and State of New Jersey, have invented a new and useful Improvement in Wheel Rims, of which the following is a specification.

This invention relates to an improvement in wheel rims, particularly those used on motor cars, and its main object is the production of a rim especially co-ordinated with the body of the wheel disclosed in our application for Letters Patent filed of even date herewith, Serial Number 344,282, but capable with variations of use on other wheels. With this and other objects not specifically mentioned in view, the invention consists in certain constructions and combinations which will be hereinafter fully described and then specifically set forth in the claims hereunto appended.

In the accompanying drawing which forms a part of this specification, the figure is a fragmentary cross sectional view of a rim constructed in accordance with the invention.

Referring to the drawing, there is provided a continuous rim 1 which may be demountable or fixed to a wheel body. As shown, the rim is of the demountable type and is provided with two inner peripheral ribs 2 and 3 adapted to support the rim on a wheel body, each carrying a part of the load. The rib 3 is further provided with a channel 4 in the plane of wheel rotation and supports a split tire flange 5 engaging the channel and adapted to underlie a tire bead at 6. A tire bead cannot stretch far enough to accidentally release the tire flange from its engagement with the channel 4, even if deflated. So long as the tire bead itself is not destroyed, the tire cannot work, blow, or be thrown off the rim. Thus, the tire itself locks the tire flange securely in position. Yet, when it is desired to demount the tire from the rim, it is only necessary to deflate the tire, push it inward where the split in the tire flange is, lift one end of said flange out of the channel, and then peel the flange off, the flange itself pushing the tire back progressively as it progressively comes out of the channel. A reverse operation confines the tire on the rim and locks the tire flange in operative position.

The rim is depressed and apertured at 7. Swaged into the rim at this point is a rim driving sleeve 8 which is adapted to project through a suitable rim driving aperture in a wheel body. This sleeve further serves to enclose a tire valve stem 9 of standard construction, and to form a seat at its inner end for a standard stem nut 10 and cap 11. The sleeve 8 is large to provide a large driving surface and to permit the whole valve structure to go into place, or come out of place, intact, when mounting or demounting the rim, and to fully protect the structure from water, dust of mud whether the rim and tire be on or off the wheel. In view of the fact that with rims in commercial use heretofore it has been necessary to remove the valve nut and cap from the stem before a rim could be demounted, and to replace them after a rim has been mounted, it will be readily understood that the present structure effects a material saving in time and labor when mounting or demounting a rim.

A less desirable but nevertheless effective structure would include a rim driving member separate from the valve structure capable of being mounted or demounted intact.

Changes and variations may be made in the structure by means of which the invention is carried into effect, particularly when the rim is to be used on wheel bodies other than the one hereinbefore identified. The invention, therefore, is not to be restricted to the precise details of the structure shown and described.

What is claimed is:

1. A continuous wheel rim provided with a relatively immovable inwardly projecting rim driving sleeve adapted to engage the wall of a suitable rim driving aperture in a wheel body on which the rim is mounted and to enclose a tire valve stem and to form a seat for its cap.

2. A continuous wheel rim provided with a relatively immovable inwardly projecting rim driving sleeve adapted to engage the wall of a suitable rim driving aperture in a wheel body on which the rim is mounted and to enclose a tire valve stem and to form a seat for its cap, said rim also having two integral inner peripheral ribs adapted to support the rim on a wheel body one rib being provided with an annular channel, and a removable split tire flange engaging said channel and provided with a cylindrical section adapted to underlie a tire bead and with a curved section adapted to engage the side of said bead.

3. A continuous wheel rim provided with a relatively immovable inwardly projecting rim driving sleeve adapted to engage the wall of a suitable rim driving aperture in a wheel body on which the rim is mounted and to enclose a tire valve stem and to form a seat for its cap, said rim also having an integral inner peripheral channeled rib and an integral inner peripheral triangular rib both ribs being adapted to support the rim on a wheel body and the triangular rib being also adapted to co-operate with rim holding devices carried by the wheel body, and a removable split tire flange engaging the channeled rib and provided with a cylindrical section adapted to underlie a tire bead and with a curved section adapted to engage the side of said bead.

In testimony whereof, we have signed our names to this specification.

SYDNEY I. PRESCOTT.
FRANCIS J. RUMMLER.